United States Patent
D'Auria et al.

(10) Patent No.: US 7,635,007 B2
(45) Date of Patent: Dec. 22, 2009

(54) METHOD OF REPAIRING A LEAK IN A FLANGE OF A GAS PIPE

(75) Inventors: Vincent Boulet D'Auria, Eze (FR); Hacen Slimani, Nice (FR)

(73) Assignee: Vincent Boulet D/Auria, Eze (FR)

( * ) Notice: Subject to any disclaimer, the term of this patent is extended or adjusted under 35 U.S.C. 154(b) by 106 days.

(21) Appl. No.: 11/587,429

(22) PCT Filed: Apr. 12, 2005

(86) PCT No.: PCT/FR2005/000876

§ 371 (c)(1),
(2), (4) Date: Oct. 25, 2006

(87) PCT Pub. No.: WO2005/111493

PCT Pub. Date: Nov. 24, 2005

(65) Prior Publication Data

US 2008/0092972 A1    Apr. 24, 2008

(30) Foreign Application Priority Data

Apr. 28, 2004   (FR) .................................. 04 04484

(51) Int. Cl.
*F16L 55/16*    (2006.01)
(52) U.S. Cl. .......................................... 138/99; 138/97
(58) Field of Classification Search ............. 138/99, 138/97

See application file for complete search history.

(56) References Cited

U.S. PATENT DOCUMENTS

| 3,563,276 | A | * | 2/1971 | High et al. | 138/99 |
| 3,938,774 | A | | 2/1976 | Smith | 249/90 |
| 4,053,176 | A | * | 10/1977 | Hilbush | 285/15 |
| 5,988,224 | A | | 11/1999 | D'Auria | 138/99 |
| 6,217,688 | B1 | * | 4/2001 | Landers | 156/94 |
| 6,334,465 | B2 | | 1/2002 | D'Auria | 138/99 |
| 2006/0162797 | A1 | | 7/2006 | D'Auria | 138/99 |

FOREIGN PATENT DOCUMENTS

| GB | 2080916 | | 2/1982 |
| GB | 2093146 | A * | 8/1982 |

* cited by examiner

*Primary Examiner*—Patrick F Brinson
(74) *Attorney, Agent, or Firm*—James C. Lydon

(57) ABSTRACT

A method of repairing a pipe (11) containing a pressurized fluid and having at least one leak, for instance in a flange (10), including the steps of installing a flexible and sealed casing (12) engaging the pipe on each side of the leak site to enclose the leak, the casing including a valve arranged at the highest point if the fluid is a gas or at the lowest point if it is a liquid; installing a rigid and sealed casing (20) engaging the pipe on either side of the flexible casing and enclosing the casing; and injecting a polymerizable liquid material into the rigid casing, so that the flexible casing is enclosed in a sleeve of polymeric resin after polymerization of the polymerizable material.

8 Claims, 1 Drawing Sheet

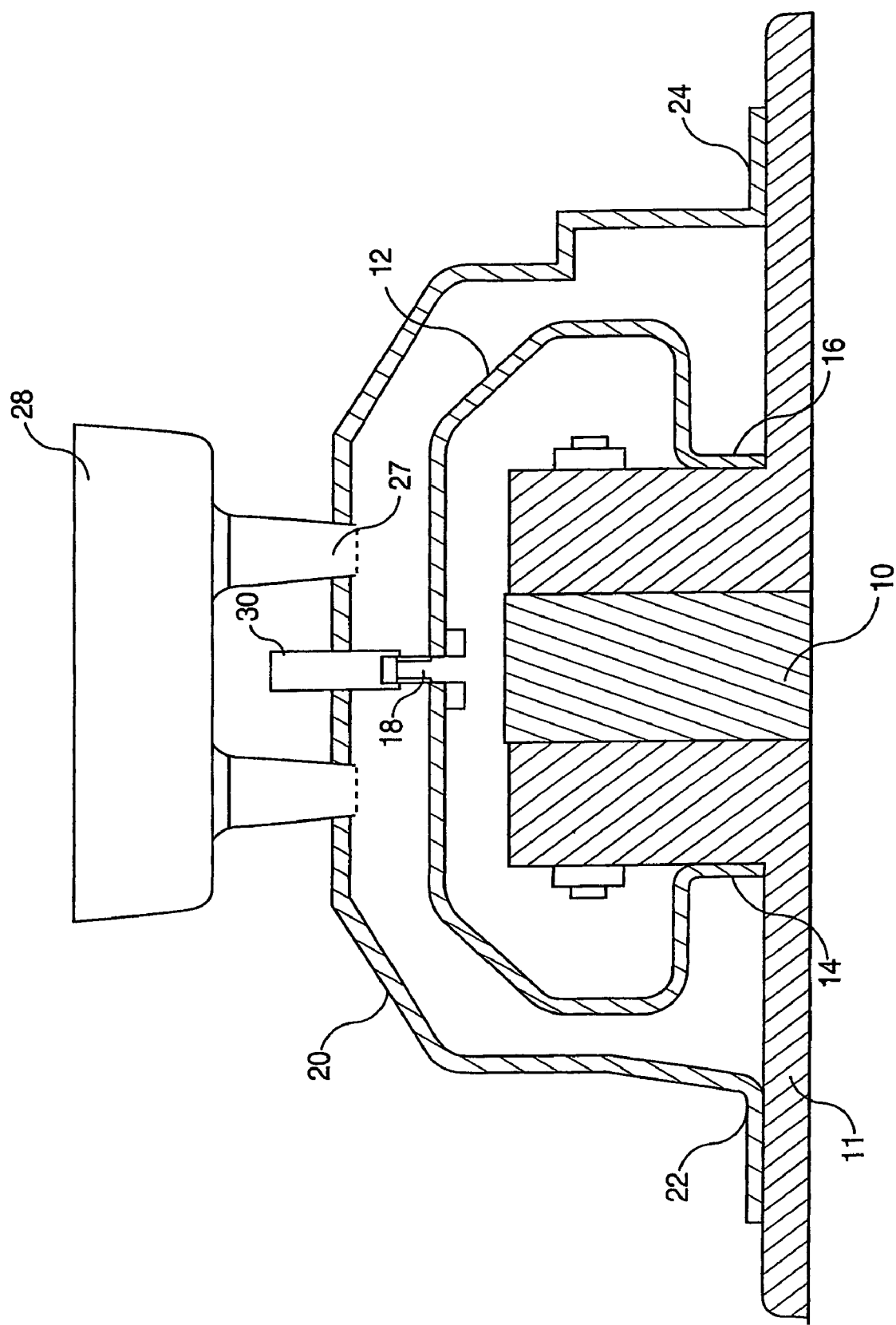

METHOD OF REPAIRING A LEAK IN A FLANGE OF A GAS PIPE

TECHNICAL FIELD

This invention concerns repairing leaks in pipes which convey pressurised fluid and particularly a method for repairing a pipe conveying fluid at the leak site.

BACKGROUND ART

Owing to their design, flanges always employ a "seal" made of more or less rigid material capable of providing a hermetic seal locally. This part represents a weak point in the flange and becomes the main source of the leak. This defect is accentuated when the flange is operated under pressure. For this reason, pipe leaks often occur in flanges.

Repairing leaking flanges while maintaining the pipe in operation remains very delicate. In the case of colourless gas, the operation's complexity stems from the difficulty in locating the leak which may occur in the upper part of the seal, or travel through the mounting bolts. In such conditions, the leak remains undetectable.

There are currently three categories of repair processes although their efficiency depends on the flange's damage and particularly on the operating conditions (temperature, pressure, type of fluid . . . ). Thus, in the conventional mechanical process, two half-clamps are used to enclose the flange. These clamps, are often made of steel, heavy and bulky, create mechanical stresses and weaken the flange. This technology employs either elastomeric seals to be compressed when clamped around the flange, or an overmoulding resin injected into the void formed between the clamp and the flange. The repair thus condemns the flange as the resin is often a powerful adhesive that is very difficult to remove.

In the majority of cases, the leaking flanges are often inaccessible, obstructed, damaged and even sometimes ovalised. As a result, the use of a sealing clamp is not always obvious as it is bulky and heavy and always causes premature ageing of the pipe and leads to the formation of cracks.

If resin overmoulding is used, the metal casing creates the same stresses as previously described in addition to the difficulties related to the injection operation. Furthermore, it is impossible to inject any resin whatsoever while the flange is leaking as major adhesion problems appear. In addition, pressurized injection is not possible as the operator may accidentally force resin into the pipe.

A second process, used particularly in Great Britain, consists in injecting the resin. The flange is perforated and an adapted resin is injected into the leaking seal. The resin is supposed to travel around the flange, fill in any voids, polymerise despite the operating conditions and stop the leak. The use of this delicate and unpredictable technology remains rather limited in maintenance departments.

Finally, the "banding" process consists in applying a strip of glass fibre that has been pre-impregnated with resin. The application is difficult or even impossible under pressure. This "tourniquet" system around the leaking flange resembles more an emergency quick-fix than certified repair by professionals. This process presents major drawbacks. Particularly, it can be used only if the surface of the flange is prepared and cleaned to ensure proper adhesion of the composite (which cannot be guaranteed with an application in a leak environment) and, if installed correctly, prevents all access to the flange and prevents it from being dismantled during scheduled maintenance operations.

DISCLOSURE OF THE INVENTION

This is why the purpose of the invention is to design a method for repairing a pipe containing a pressurised fluid that can be performed easily and efficiently while the pipe is maintained in operation.

Another purpose of the invention is to define a method of repairing a pipe containing pressurised fluid, and having a leak on a flange, which leaves the flange intact and enables access to the flange in the event major intervention on the flange is required.

The subject of the intervention is thus a method of repairing a pipe containing a pressurised fluid having at least one leak, including the following steps:

a) installation of a flexible and sealed casing bearing on the pipe on each side of the leak and enclosing same, the flexible casing featuring a valve so that the fluid from the leak can escape, b) installation of a rigid and sealed casing bearing on the pipe on each side of the flexible casing and enclosing same, and c) injection of a polymerisable liquid inside the rigid casing, the flexible casing thus being enclosed inside a sleeve of polymeric resin following the polymerisation of the polymerisable material.

DETAILED DESCRIPTION OF THE INVENTION

The purposes, objects and characteristics of the invention will become more apparent from the following description when taken in conjunction with the sole FIGURE representing a cross-section of the flange and the two casings used to implement the method according to the invention.

In the following description, it is assumed that a leak was detected on a flange 10 of a cylindrical pipe 11 containing a pressurised fluid. However, this leak may be located anywhere on the pipe, other than on a flange.

In this example, the pipe 11 is a gas transmission line such as a pipe carrying one or more electric cables in a sulphur hexafluoride gas atmosphere intended to ensure electrical and thermal insulation of the pipe. It may also be a fluid transmission line. It should be noted that the precise location of the leak is not important, as will be disclosed below.

The first step of the method according to the invention consists in enclosing the flange with an initial flexible and sealed casing 12 having the shape of an open ring at its base in order to enclose the flange 10. To do this, the edges 14 and 16 of the casing, perpendicular to the axis of the pipe 11, are secured to the side flanks of the flange, using double-sided adhesive, for example.

The flexible and sealed casing 12 features an opening to the exterior, i.e. a valve 18. It is recommended that this valve be placed at the highest point on the casing during installation, as illustrated in the FIGURE. Of course, this valve would be located at the lowest point if the pipe contained liquid. This valve allows the release of gases from the leak when the casing has been installed around the flange. It can thus be seen that the exact location of the leak is not important as the leaking gas is captured in the sealed casing 12 and can only exit via the valve 18.

When the flexible casing 12 has been completely installed, the valve cap is removed to release the leaking gas without causing overpressure in the casing. It should be noted that it is recommended that a casing be able to withstand the pressure of the gas, although this is not mandatory.

The second step consists in installing a second rigid and sealed casing 20 enclosing the first casing and having the shape of a ring open at its base in the same manner as the first casing. The casing is secured to the pipe 11 by its two edges 22 and 24 using an appropriate mounting means such as foam adhesive. It should be noted that the rigid casing 20 may be any type of sleeve designed to plug leaks in pipes, and particularly the modular sleeve which forms the subject of the patent. Generally speaking, the sleeve is solidly secured to the pipe 11 by means of straps (not represented) which clamp the edges 22 and 24 of the flange.

It should be noted that, when the pressure of the fluid inside the pipe is high, in excess of 15 bar for example, it may be judicious to reinforce the flexible casing by the installation of an insert wound around the casing as described in the patent application.

The rigid and sealed casing or sleeve 20, is intended to receive a polymerisable material. To do this, it features at least one injection hole 27 into which an adapted funnel 28 is inserted to pour in the polymerisable material. The injection hole of the rigid casing must be placed at the high point of the casing and near the valve 18 (when dealing with a gas pipe).

The rigid casing 20 features a hole placed exactly in line with the valve 18 so that a guide tube can be introduced and fitted around the valve. This guide tube is designed to direct the gas out of the rigid casing.

The third step consists in injecting a polymerisable resin into the rigid casing 20 by pouring the liquid resin into the funnel 28. The liquid polymerisable material fills the entire volume of the rigid casing on the outside of the flexible casing. Owing to the guide tube 30 which fits snugly around the valve 18, the liquid material cannot penetrate into the flexible casing while the leaking gas continues to exit through the valve 18.

At this stage, two variants are possible. According to a first variant, the valve's closure plug is introduced into the guide tube 30 when the level of the resin reaches the valve and the valve is closed using the cap. Then, after the guide tube is removed, more liquid resin is introduced until the level reaches the injection holes, with the valve being encapsulated in the resin. It goes without saying that this technique can only be used if the flexible casing is capable of resisting a pressure greater than that of the gas inside the pipe.

According to the second variant, the resin is injected until it reaches the injection holes without the guide tube being removed. Once the resin has polymerised, and is thus solid, the cap is introduced into the guide tube and the valve is closed.

The method just described has the advantage of protecting the flange inside the flexible casing while also ensuring a total seal. Afterwards, if the flange must be accessed for a major operation, all one needs is breaking the polymerised resin sleeve and uncover the flange by removing the flexible casing.

While the description above concerns a leak located on a flange, it goes without saying that the method according to the invention can be applied to all leaks anywhere on the pipe, that is other than on a flange. In this case, the flexible casing is secured directly on the outer wall of the pipe in the same manner as the rigid casing is mounted.

The invention claimed is:

1. A method of repairing a pipe containing a pressurized fluid featuring at least one leak, comprising:
   a) installation of a flexible and sealed casing bearing on the pipe on each side of the leak and enclosing same, said casing featuring a valve so that the fluid from the leak can escape,
   b) installation of a rigid and sealed casing bearing on the pipe on each side of said flexible casing and enclosing same, and
   c) injection of a polymerizable liquid inside said rigid casing, said flexible casing thus being enclosed inside a sleeve of polymeric resin following polymerization of the polymerizable material,
   wherein the leak is located in a flange,
   wherein the pressurized fluid is a gas, said valve being arranged at the highest point of said flexible casing so that the gas from the leak can escape, and
   wherein said rigid casing includes a hole located in line with said valve through which a guide tube designed to fit around said valve is introduced and whose function is to direct the gas outside said rigid casing.

2. The method of 1, wherein said rigid casing includes at least one injection hole placed near said valve so as to introduce a funnel enabling said polymerizable material to be poured into said rigid casing.

3. The method of claim 2, wherein a closing plug of said valve is introduced into said guide tube when the level of resin reaches said valve so as to close it using the plug, more liquid resin is then poured until said injection hole is filled, and said guide tube is removed so that said valve is encased in the resin.

4. The method of claim 2, wherein the resin is injected until said injection hole is reached and a closing plug is introduced into said guide tube in order to close said valve when the resin is polymerized and thus solid.

5. The method of claim 1, wherein said rigid casing includes two edges which are secured on the pipe using an appropriate mounting means.

6. The method of claim 5, wherein straps are used to secure said edges of said rigid casing to the pipe.

7. The method of claim 5, wherein said rigid casing is a modular sleeve.

8. The method of claim 5, wherein said mounting means comprises foam adhesive.

* * * * *